Feb. 3, 1970    F. H. WARE    3,493,300
COLOR INTEGRATOR
Filed Aug. 31, 1967

INVENTOR:
FRED H. WARE

Andrew F. Wintercorn
Atty.

United States Patent Office 3,493,300
Patented Feb. 3, 1970

3,493,300
COLOR INTEGRATOR
Fred H. Ware, Rockford, Ill., assignor to Andrew F. Wintercorn, Rockford, Ill.
Filed Aug. 31, 1967, Ser. No. 664,742
Int. Cl. G03b 27/32, 27/52
U.S. Cl. 355—32                        8 Claims

ABSTRACT OF THE DISCLOSURE

An apparatus for producing color slides from black and white negatives having two projectors, a beam splitter and a camera. The first projector, having a black and white negative mounted thereon, projects onto the back of the beam splitter. The beam splitter is positioned at an angle of 45° relative to the optic axis of the first projector. The second projector utilizes filters to project colored light upon the front side of the beam splitter that correspond to the opaque portions of the negative. A camera is positioned to accept the reflected colored light and transmitted light to form a color exposure of the black and white negative. The apparatus may be made either collapsable and portable or rigid and stationary.

---

This invention relates to a color integration device designed to enable one to make color slides from original black and white film negatives, and obtain exactly the coloring or combination of colors desired.

The invention utilizes the well-known split beam technique in a novel combination whereby color filters placed horizontally below and in spaced relation to an inclined two-way mirror over a light source have colored light beams projected toward the mirror reflected horizontally toward the camera from only those areas where the negative is opaque when the black and white negative used in the making of a color slide and disposed behind and spaced from the mirror in line with the lens of the camera has a light source behind it projecting the opaque portions in the original negative horizontally onto the back of the mirror, thereby coloring these portions with one or more colors, as determined by the color filter means used and how they are arranged with respect to one another or combined with one another.

The invention is illustrated in the accompanying drawing, in which.

Similar reference numerals are applied to corresponding parts throughout the views.

Figure 1:
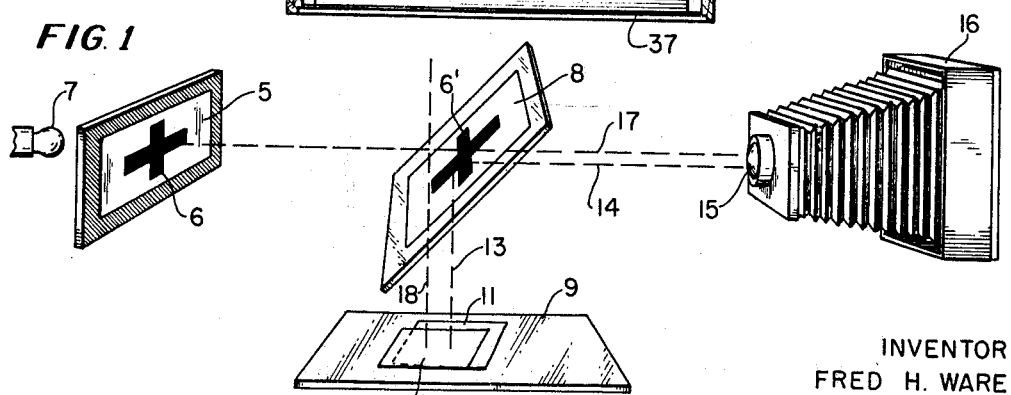
FIG. 1 is a diagrammatic perspective view illustrating the various components of my color integrator and illustrating how it operates.

Looking first at FIG. 1, the black and white negative is indicated at 5 as having a suitable opaque portion 6 so that when the light from bulb 7 passes horizontally through film 5 the opaque portion is projected onto the back of the two-way mirror or beam splitter 8, as indicated at 6'. The two-way mirror or beam splitter 8 is inclined at an angle of approximately 45° relative to the vertical and disposed above a horizontal pane of opal glass 9 over which a color filter 10 or a combination of color filters 10 and 11, or even more, may be placed, so that when the light bulb 12 disposed under the opal glass 9 is turned on vertical colored beams 13 striking the portions 6', corresponding to the opaque portions 6 of the film 5, will be reflected horizontally as at 14 toward the lens 15 of the camera 16, along with the light rays 17 that outline the opaque portion 6 for the benefit of the lens 15 of the camera, the beams 14 and 17 together presenting a colored image to the lens 15, colored by one, two or more colors, depending upon how many color filters are employed at 10 and 11 and how they are arranged with respect to one another or superimposed on one another, as, of course, if filter 10, for example, is blue, and filter 11 is yellow, the combination is green. Thus, the coloring possibilities are truly unlimited, also the placement of the different colors with respect to one another in the final picture obtained with the film in the camera 16 when the exposure is made. Any colored beams not intercepted by the image 6' on the two-way mirror 8 are allowed to pass freely therethrough, as indicated at 18. That is the reason that only the parts one desires to color are colored.

Figure 2:
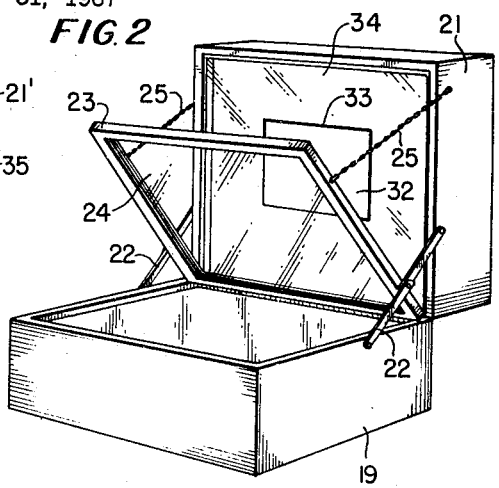
FIG. 2 is a perspective view of the color integrating device in its foldable form designed for portability.
Figure 4:
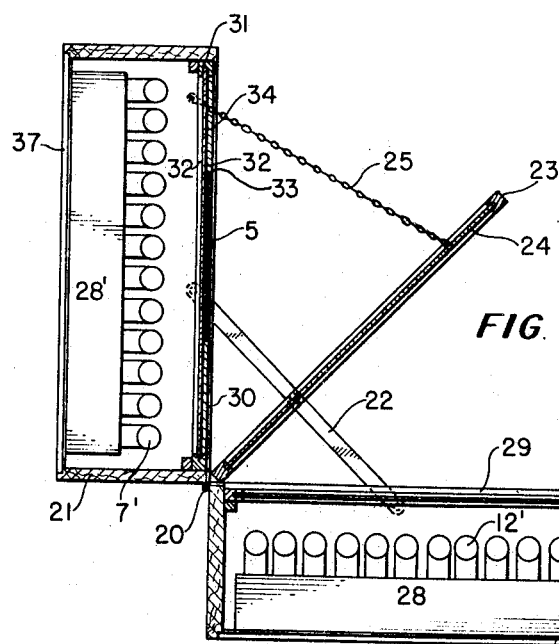
FIG. 4 is a central vertical section through the device of FIG. 2, having its parts arranged similarly as those in FIG. 1.

Referring now to FIGS. 2 and 4, 19 designates the horizontal or lower case section to which is hingedly connected as at 20, one side of the upper case section 21, fall supports 22 being provided on opposite sides pivotally connected to the two sections on the outside, so that the frame 23 for the two-way mirror or beam splitter 24 can be supported in the 45° position shown resting at its lower end over the hinges 20 and supported by chains 25 from the sides of the upper case section 21. A frame 26 resting on a ledge 27 in the lower case section 19 carries the pane 9 of opal glass in vertical spaced horizontal relationship to the bank of fluorescent lights 12' that are carried on the metal ballast box 28 fixed to the bottom of the lower case section 19. The recess at 29 is approxiately equivalent to half the thickness of the frame 23 and the latter is placed therein for storage when the case is to be closed, the other half of the frame 23 being received in the recess 30 provided in the upper case section 21 in front of a frame 31 carrying another pane 32 of opal glass in front of which the original black and white film negative 5 is adapted to be a suitably supported frame in an opening 33 provided in a heavy cardboard covering 34 for the pane 32. In that way the light from the fluorescent lights 7' passes only through the negative 5 in a horizontal direction toward the camera. The fluorescent lights 7' are carried on a ballast box 28' secured to the top of the upper case section 21.

The operation of the device of FIGS. 2 and 4 is believed to be clear from the description of FIG. 1. The masks 34 will have different sized openings 33 for different sizes of original negatives 5, and in every instance the opening 33 must, of course, be on a level below the top cross portion of the frame 23 so that the latter does not constitute an obstruction to the light beams 17. This device, being foldable and portable, can be set up wherever it is to be used and then folded again and taken to some other place for the next use, and, although no fasteners are shown opposite the hinges 20 for fastening the sections 19 and 21 together in closed position, nor any carrying handles on the outer side remote from the hinges 20, it is therefore understood that these will be provided. So far as the color filters 10–11 are concerned, it is understood that one or any combination of two or more filters may be employed in whatever relationship is desired, or vari-clored filters might conceivably be employed for unusual coloring effects of colored slides. The beam splitter 24 is preferably a pane of colorless glass although a two-way mirror may be used.

Figure 3:
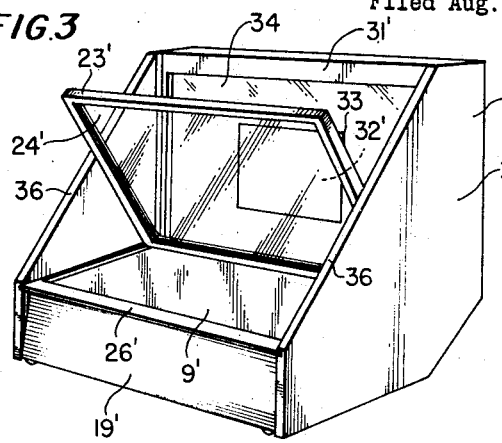
FIG. 3 is a similar perspective view of another design that is not foldable.

The color integrator shown in FIG. 3 is non-foldable and designed to be used always in one place instead of being carried from place to place. For that reason, the frame 23' carrying the two-way mirror or beam splitter 24' is fixedly mounted at the 45° angle shown between the vertical pane 32' and the horizontal pane 9' of opal glass in the case 35. The lower horizontal portion 19' of this case corresponds to the lower section 19 of the other case, and, of course, contains the fluorescent lights 12' under the pane 9', while the vertical rear section 21' of this case contains the fluorescent lights 7' behind the pane 32'. The frame 26' for pane 9' is fixed in the upper portion of the section 19' and the frame 31' for pane 32' is fixed in the front portion of section 21'. Frame 23' for pane 24' is fixed between the side walls 36 of the case 35. The bottom of the lower section 19' and the back of the rear section 21' may both be removably secured in place to afford access to the fluorescent lights 7' and 12' by having the ballast boxes 28 and 28' mounted on removable panels 37 (see FIG. 4).

Is is believed the foregoing description conveys a good understanding of the objects and advantages of my invention. The appended claims have been drawn to cover all legitimate modifications and adaptations.

I claim:

1. In combination, a camera, two projectors, a beam splitter pane disposed on a line between one of said projectors and said camera, said beam splitter being inclined toward said camera and away from said projector at an acute angle of approximately 45° relative to said line, the other of said projectors being disposed between said camera and the first named projector on a line substantially at 90° transverse relative to said first line and spaced from said beam splitter, the last named projector having means for supporting one or more color filters in normal projection relationship to said 90° line, and means for supporting a black and white film negative on the first named projector in normal projection relationship to the line from said projector to said camera, said camera having color film therein whereby to make color slides from original black and white film negatives.

2. In combination with a camera having color film therein and a beam splitter pane disposed spaced from the front of but on a line normal to the lens of the camera and at an acute angle to said line inclined toward said camera for reflection purposes, a first light source disposed in spaced relation to but behind and facing said beam splitter and normal to the aforesaid line, means for mounting a black and white film negative in front of said light source for the sole illumination thereof, a second light source disposed in spaced relation to but in front of said beam splitter and facing the same and on a line in transverse relation to the first line, and color filter means disposed in front of said second light source for the sole illumination thereof.

3. The method of making color slides from black and white film negatives which consists in projecting said film negatives onto the back of a beam splitter pane to define reflective areas thereon corresponding to the dark areas of the film negative, projecting coloring onto the front of said beam splitter so as to reflect toward a camera the coloring from the reflective areas only, and then photographing the black and white film negative through said beam splitter using color film in the camera.

4. A device of the character described comprising two light box sections disposed in substantially right angle relationship to one another, each having a translucent cover on the adjacent light emitting inner sides thereof, one of said translucent covers being adapted for supporting color filter means substantially parallel thereto, the other of said translucent covers being adapted for supporting a black and white film negative substantially parallel thereto in a plane substantially at right angles to and spaced laterally and vertically relative to said color filter means, and a beam splitter pane disposed at an angle of approximately 45° to and between said covers with the back toward said negative and the front facing said color filter means, the light boxes being hingedly connected and foldable from an open right angle relationship to a closed substantially parallel abutting relationship with the beam splitter disposed therebetween.

5. A device as set forth in claim 4 wherein the beam splitter is removably mounted in the 45° operative position, and there is room provided for storage of the beam splitter between said light boxes.

6. A device as set forth in claim 4 including fall support means interconnecting the light boxes so that one can be supported in a substantially horizontal position with the other standing substantially vertically relative to one side thereof.

7. A device as set forth in claim 4 including means for supporting said beam splitter in its 45° position from one of said light boxes.

8. In combination, a camera having color film therein, two projectors, a beam splitter pane disposed on a line between one of said projectors and said camera, said Beam splitter being inclined at an acute angle relative to said line toward said camera, the other of said projectors being disposed between said camera and the first named projector on a line transverse relative to said first line and spaced from said beam splitter, and color filter means between said beam splitter and said last named projector for projecting coloring onto said beam splitter so as to reflect toward said camera coloring from areas of said beam splitter delineated by the light image projected by said first named projector.

References Cited

UNITED STATES PATENTS

| 3,085,470 | 4/1963 | Berger | 353—29 |
| 3,318,185 | 5/1967 | Kott | 353—31 |

NORTON ANSHER, Primary Examiner

W. A. SIVERTSON, Assistant Examiner

U.S. Cl. X.R.

355—43, 71